Dec. 21, 1954 G. W. HOBBS 2,697,549

ELECTRONIC MULTIRADIX COUNTER OF MATRIX TYPE

Filed March 18, 1950 3 Sheets-Sheet 1

Inventor:
George W. Hobbs,
by
His Attorney.

Dec. 21, 1954 G. W. HOBBS 2,697,549

ELECTRONIC MULTIRADIX COUNTER OF MATRIX TYPE

Filed March 18, 1950

3 Sheets-Sheet 2

Inventor:
George W. Hobbs,
by Claude A. Mott
His Attorney.

Dec. 21, 1954 G. W. HOBBS 2,697,549

ELECTRONIC MULTIRADIX COUNTER OF MATRIX TYPE

Filed March 18, 1950 3 Sheets-Sheet 3

Inventor:
George W. Hobbs,
by [signature]
His Attorney

United States Patent Office 2,697,549

Patented Dec. 21, 1954

2,697,549

ELECTRONIC MULTIRADIX COUNTER OF MATRIX TYPE

George W. Hobbs, Scotia, N. Y., assignor to General Electric Company, a corporation of New York Application March 18, 1950, Serial No. 150,395

12 Claims. (Cl. 235—61)

This invention relates to electric counters, more particularly to electronic multiradix counters, and has for one object the provision of a simple and reliable electronic counter of a matrix type readily adjustable by switch means to readily count in any of a plurality of radices and produce voltage signals indicative of the count as it progresses.

Another object is to provide a simple and reliable electronic counter of a matrix type readily adjustable by switch means to determine the least residue of a number to a selected modulus.

A selective electronic counter as above defined is particularly useful in digital calculation devices, and also has application wherever counting or control procedures are required in industrial processes.

In general, my invention consists of an electronic control including a binary counter and means for selectively controlling the operation of the counter depending upon the radix selected comprising in cooperative arrangement an electric matrix, selective switch means, unidirectional buffer means, a binary selective gate and a pair of gated electric signal means, and means for producing voltage signals corresponding each to a different operative condition of the binary counter.

Figure 1A:
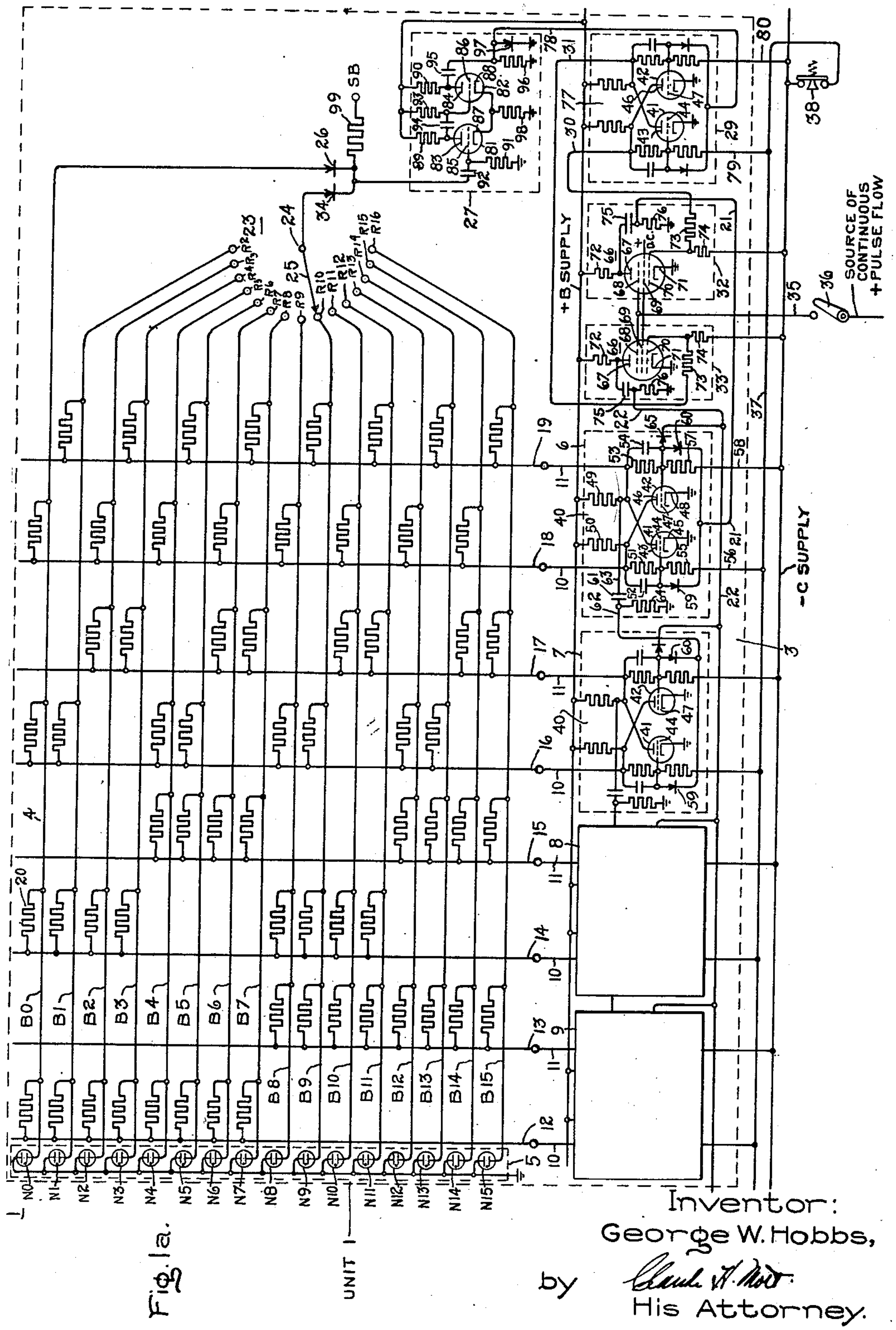
Figure 1B:
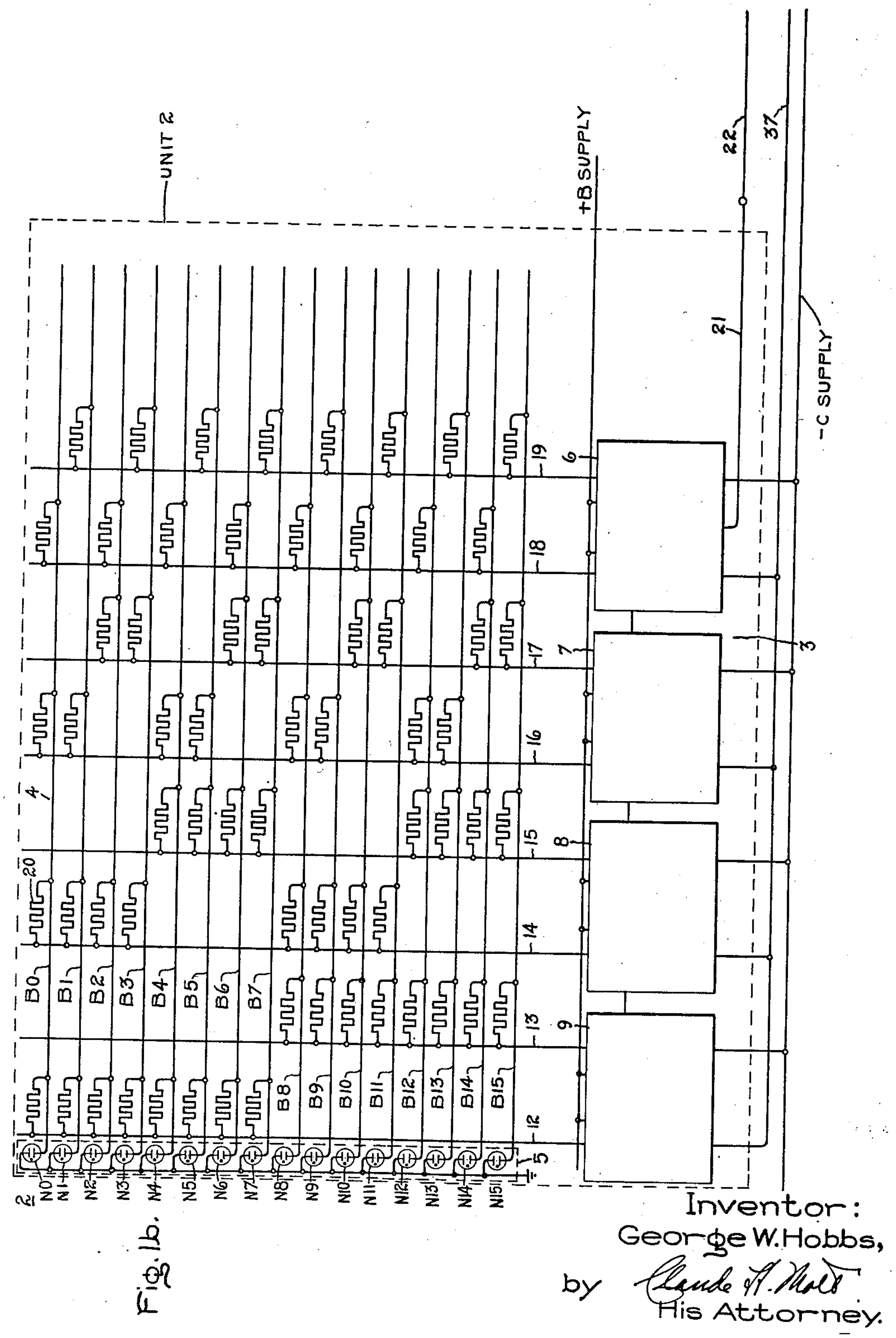
Figure 2:
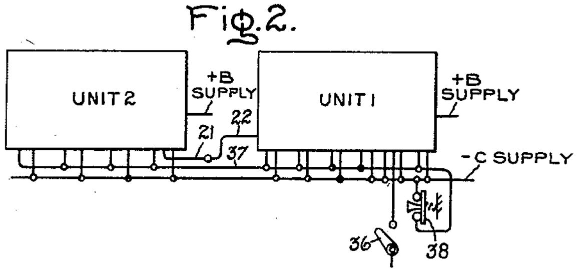
Figure 3:
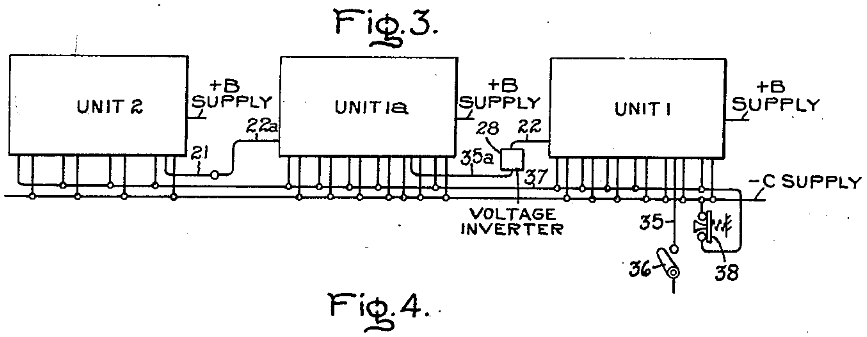
Figure 4:
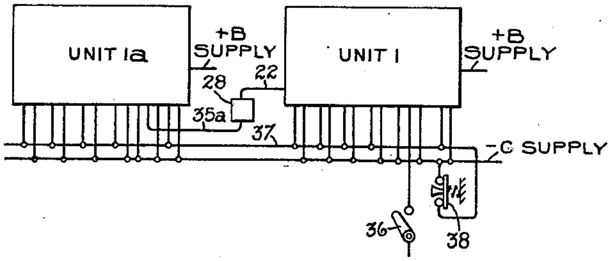
Figure 5:
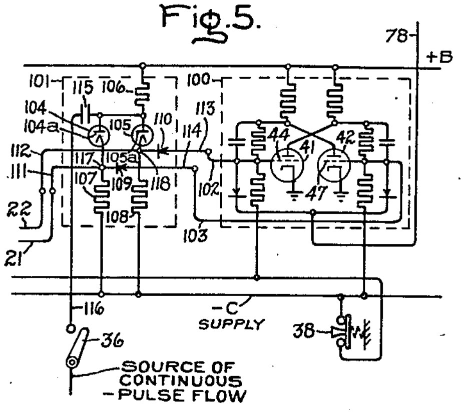

For a complete understanding of my invention, reference should be had to the following specification and the accompanying drawings in which similar elements are given the same character reference throughout the drawings. In the drawings, Figs. 1*a* and 1*b* are diagrammatical views respectively of two basic units used in forming electronic matrix counters illustrative of my invention; Figs. 2–4 are diagrammatical views of combinations of the two basic units shown in Figs. 1*a* and 1*b*, each combination forming a modification illustrative of my invention; and Fig. 5 is a diagrammatical view of a portion of Fig. 1*a* showing a further modification of my invention.

To better understand the objects of my invention and the advantages produced thereby, the following brief reference to conventional ring-type electronic counters may be helpful.

In conventional ring-type electronic counters, a plurality of triode tubes are electrically connected between sources of different voltage potential and to a source of voltage impulse, the anode of each of the tubes being electrically connected to the grid of each of the remaining tubes through a different resistance and capacitance. The number of tubes required for a particular radix is equal to the radix number or twice or even four times that number depending upon the type of triggering used. For example, to count in the base ten, ten tubes are required for each digit in one method of triggering and for a more readily adjustable and reliable circuit twenty tubes are required for each digit. The requirement of ten or twenty tubes for each digit plus the above-described interconnection of the anode plates and the grids of such tubes results in a complicated and costly structure.

Moreover, where twenty tubes are required for each digit of the number to be counted, a voltage tolerance of only 5% is allowable. That is, variations of more than 5% in the designed voltage characteristics of the system result in improper operation and consequent loss of accuracy of the counter. Also, characteristics for a given type of tube vary, and although a tube is designed for particular characteristics, each and every tube of that type does not have exactly the same characteristics.

Further, in the application of a tube in a circuit such as a ring-type counter circuit, it is not likely that each element of the tube will be provided with voltages in exact conformity with the tube rating, and therefore 100% accuracy in normal operating characteristics as compared to ideal conditions cannot be expected. In short, when rigid voltage tolerances in the order of 5% are required by nature of the circuit, as in the ring-type counter circuit, a disadvantage of extreme care and accuracy of adjustment is introduced.

As a further disadvantage of the conventional ring-type counter, those skilled in the art will understand that it is not practically feasible to segregate portions of a ring counter circuit by switching means to provide therein a means for readily selecting the radix in which the count is to be made. Such selection is advantageous in cases where it is desired to count in terms of say 8 or 12 as where screws are to be assembled in a web and the web is to be cut in lengths holding 8 screws in each length of web. In the conventional ring counter, a separate counter is required for practical reasons above mentioned for each radix of count. A definite advantage is therefore provided in an electronic counter in which the base of count is readily selected by switching means thereby eliminating the need for an additional counter for each radix of count contemplated.

Therefore, in accordance with my invention, to reduce the complexity and consequent cost of electronic counters, to provide therein more liberal voltage tolerances, and to provide means for readily selective variation of the base in which the count is to be made, I provide an electronic matrix counter, one aspect of which is illustrated by Figs. 1*a*, 1*b*, and 2 of the drawings. Referring to the drawings, I have shown in diagrammatical form in Figs. 1*a* and 1*b* respectively a first and a second basic unit numbered respectively 1 and 2. Units 1 and 2 each comprise a four-stage binary counter 3, an electric matrix 4, and an indicating panel 5. The stages of counter 3 are numbered 6–9 as shown, and each stage is provided with a pair of associated output conductors 10 and 11 electrically connected thereto in a predetermined relation as will be described in detail later. The matrices 4 each comprise a plurality of input conductors 12–19, a plurality of output conductors B0–B15, and a plurality of impedances 20 electrically interconnecting the input conductors 12–19 and the output conductors B0–B15, as shown in Figs. 1*a* and 1*b*. The binary counters 3 are provided each with an excitation conductor 21 electrically connected in a predetermined relation to the first stage 6 thereof to actuate the counters 3 each in response to a negative pulse voltage on its associated excitation conductor 21 to store successive binary numbers in each binary counter. Structure and operation of the binary counters will be described in detail later. Binary counter 3 of unit 1, shown in Fig. 1*a*, is provided in addition with a stage reset conductor 22 electrically connected to each of the stages 6–9 thereof in a predetermined relation as will be described in detail later to reset the binary counter of unit 1 to zero, that is, to store the binary number 0000 therein in response to a negative pulse received through stage reset conductor 22. Thus, binary counter 3 of unit 1 is excited to store successive binary numbers therein in response to successive negative voltage pulses received on its associated excitation conductor 21. Binary counter 3 of unit 2 is excited to store successive binary numbers therein in response to successive negative voltage pulses received on its associated excitation conductor 21, and binary counter 3 of unit 1 is reset to zero by a negative pulse received on its stage reset conductor 22. The pairs of output conductors 10 and 11 of each of the binary counters 3 of units 1 and 2 are electrically connected to the input conductors 12–19 of its associated electric matrix 4, as shown in Figs. 1*a* and 1*b*. As will be described in detail later, the voltage relation of the associated pairs of output conductors 10 and 11 of each binary counter and therefore the voltage relation of input conductors 12–19 of its associated matrix 4 are dependent upon the binary number stored in each of the binary counters 3. For example, assume the voltage relation of output conductors 10 positive and output conductors 11 negative relative thereto to represent the binary character 0 in each of the stages 6–9 of the binary counters 3 and the reverse voltage relation of outputs 10 negative relative to outputs 11 to represent the binary character 1 in each of the stages 6–9. Under this assumption, it will be seen that the output conductors B0–B15 are excited in sequence with a predetermined positive voltage resulting from four positive voltages applied to the output conductors B0–B15 in sequence in response to successive binary numbers corresponding to the decimals 0–15 stored in the binary counters 3. This result is showin in the following table:

| Decimal | Binary Number Stored in Binary Counter | Voltage Relation of Input Conductors of Associated Matrix | | | | | | | | Associated Matrix Output Conductors on Which the Predetermined Positive Voltage is Applied |
|---|---|---|---|---|---|---|---|---|---|---|
| | | 12 | 13 | 14 | 15 | 16 | 17 | 18 | 19 | |
| 0 | 0000 | + | − | + | − | + | − | + | − | B0 |
| 1 | 0001 | + | − | + | − | + | − | − | + | B1 |
| 2 | 0010 | + | − | + | − | − | + | + | − | B2 |
| 3 | 0011 | + | − | + | − | − | + | − | + | B3 |
| 4 | 0100 | + | − | − | + | + | − | + | − | B4 |
| 5 | 0101 | + | − | − | + | + | − | − | + | B5 |
| 6 | 0110 | + | − | − | + | − | + | + | − | B6 |
| 7 | 0111 | + | − | − | + | − | + | − | + | B7 |
| 8 | 1000 | − | + | + | − | + | − | + | − | B8 |
| 9 | 1001 | − | + | + | − | + | − | − | + | B9 |
| 10 | 1010 | − | + | + | − | − | + | + | − | B10 |
| 11 | 1011 | − | + | + | − | − | + | − | + | B11 |
| 12 | 1100 | − | + | − | + | + | − | + | − | B12 |
| 13 | 1101 | − | + | − | + | + | − | − | + | B13 |
| 14 | 1110 | − | + | − | + | − | + | + | − | B14 |
| 15 | 1111 | − | + | − | + | − | + | − | + | B15 |

Referring to the above table, it is seen that when no pulse has been received by the excitation conductor 21 corresponding to a zero count, or evidenced when the binary counter is reset to zero by a negative pulse on its reset conductor 22, the binary number 0000 is stored in binary counter 3 and the voltage relation or pattern of the input conductors 12–19 of matrix 4 is as shown in the first line of the above table. Thus, a positive voltage is applied to each of the input conductors 12, 14, 16 and 18. By reference to Fig. 1*a*, it is seen that the above-mentioned input conductors of matrix 4 are each electrically connected through a particular one of the impedances 20 to the output conductor B0 thereof. Thus, a predetermined positive voltage is applied to output conductor B0 in response to the binary character 0000 stored in the binary counter 3.

A consideration of the voltages applied to the remainder of the output conductors, that is, B1–B15 will indicate that no conductor other than B0 has four positive voltages applied thereto when the binary number 0000 is stored in its associated binary counter 3. A consideration of the voltages applied to the remainder of the output conductors, that is, B1–B15, for successive binary numbers stored in the binary counter 3 will indicate that a predetermined positive voltage is applied successively to output conductors B1–B15 for successive binary numbers equivalent to the decimals 1–15 stored in the binary counter 3.

To provide visual indication of the particular conductors B0–B15 upon which the predetermined voltage is applied, the indicating panels 5 are electrically connected each to its associated matrix 4. Each of the panels 5 comprises a plurality of neon tubes numbered N0–N15 through which the output conductors B0–B15 are respectively electrically connected to ground as indicated. Thus, when a predetermined voltage is applied to output conductor B0, for example, a sufficient voltage is applied to neon tube N0 to ionize tube N0 and the glow therefrom indicates the storage of the binary number 0000 in the associated binary counter. When the binary number 0001 is stored in the binary counter 3, a predetermined voltage is applied to the output conductor B1 of its associated matrix 4 thereby ionizing neon tube N1 associated with output conductor B1.

Thus far, I have shown means for applying a predetermined positive voltage to a different one of the output conductors B0–B15 of the matrices 4 for each different binary number stored in its associated binary counter, and neon tube means associated with each of the conductors B0–B15 for indicating the binary number stored in the binary counter.

However, cooperative control of the binary counters 3 of units 1 and 2 dependent upon the selected radix must be provided to reset the binary counter of unit 1 to zero and store the binary number 0001 in the binary counter of unit 2 after each complete cycle of the radix count. That is, if the radix 10, for example, is used, control must be provided to allow the binary counter 3 of unit 1 to count from 0–9, or one complete cycle of the radix 10 characters. Thereafter, the binary counter of unit 1 must be reset to zero, and the next or tenth count must store the binary equivalent of the decimal 1 in the binary counter of the second unit. The result then is the ionization of neon tubes N1 of unit 2 and N0 of unit 1 indicating 10 in the decimal system.

To cooperatively control the binary counters 3 of units 1 and 2, I provide a multiposition selective switch means 23, shown in Fig. 1*a*, comprising a plurality of input terminals R2–R16 corresponding to the respective radices 2–16, a common output terminal 24 and a movable arm 25 arranged for selective setting of the switch 23 to electrically connect the output terminal 24 to a selected one of the terminals R2–R16 depending upon the radix selected. The terminals R2–R16 are electrically connected respectively to the output conductors B1–B15 of matrix 4 as shown in Fig. 1*a*.

The matrix output conductor B0 is electrically connected as shown in Fig. 1*a* through a first unidirectional buffer means, as, for example, diode 26, and a voltage pulse delay and inverter means 27 and to a binary selective gate 29. The binary selective gate 29 may be any suitable two-state switching device having a pair of outputs 30 and 31 supplied one with positive voltage and the other with a voltage negative relating to the positive voltage depending upon the operative condition of the selective gate 29. The outputs 30 and 31 of selective gate 29 are electrically connected respectively to an excitation coincidence gate circuit 32 and a stage reset coincidence gate circuit 33 to condition one of said gate circuits for operation and prevent operation of the other dependent upon the operative condition of the binary selective gate 29.

The common terminal 24 of the selective switch 23 is electrically connected through a second unidirectional buffer means 34 to the voltage pulse delay and inverter means 27. The gate circuits 32 and 33 are energized simultaneously through a common conductor 35 and a common switch 36 from a source of continuous positive pulse flow indicated in Fig. 1*a*. The excitation conductor 21 of the binary counter 3 of unit 2 is electrically connected to the stage reset conductor 22 of unit 1, as shown in Fig. 2, to activate the binary counter 3 of unit 2, shown in Fig. 1*b*, in response to a reset operation of the binary counter 3 of unit 1, shown in Fig. 1*a*. A negative C supply conductor indicated and an additional reset conductor 37 shown in Figs. 1*a*, 1*b*, and 2 are both electrically connected to the binary counters 3 of units 1 and 2 and to the binary selective gate 29 of unit 1 in a predetermined relation as will be described in detail later. The negative C supply conductor and the reset conductor 37 are electrically interconnected through a normally closed momentary opening switch means 38. As will be described in detail later, a momentary opening of switch 38 resets the binary counters 3 to zero and resets the binary selective gate 29 to the particular operative condition in which a positive voltage is applied to output 30 and a negative voltage to output 31 of selective gate 29 to condition the excitation gate circuit 32 for operation and prevent operation of the stage reset gate circuit 33.

To show the operation of the combination of units 1 and 2 as shown in Fig. 2 and as defined above, assume a count of 21 is to be made in selected radix 10. If the binary counters 3 of units 1 and 2 are correctly controlled, the result is indicated by ionization of neon tubes N2 of unit 2 and N1 of unit 1. To begin the operation, the radix 10 is selected by moving the arm 25 of selective switch 23 to engage the terminal R10 of the switch 23 thereby electrically connecting output conductor B9 of matrix 4 of unit 1 to its associated buffer means 34. Thereafter, switch 38 is momentarily opened to reset the binary counters 3 of units 1 and 2 to zero and to set the binary selective gate 29 of unit 1 to the particular operative state in which excitation gate circuit 32 is conditioned for operation. Units 1 and 2 are now ready for operation to count voltage pulses received from the source of continuous pulse flow indicated in Fig. 1*a*, when switch 36 is closed.

The first eight positive pulses actuate the gate circuit 32 to store successively in the binary counter 3 of unit 1 the binary equivalents of the decimals 1–8. As a result, as shown in the preceding table, a predetermined positive voltage is applied to output conductors B1–B8 of matrix 4 of unit 1 in sequence. Since none of the conductors B1–B8 are electrically connected to the binary selective gate 29, the operative condition of selective gate 29 remains the same and gate circuit 32 remains conditioned for operation throughout the first 8 counts. Gate circuit 33 remains inoperative. However, when the ninth pulse is applied to the binary counter 3 of unit 1 through gate circuit 32, a predetermined positive voltage is applied to output conductor B9 of matrix 4 of unit 1 as indicated by the preceding table. The predetermined voltage thus applied to output conductor B9 is sufficient to pass through the unidirectional buffer means 34 electrically connected thereto through the selective switch means 23 and to the voltage pulse delay and inverter means 27 and selective gate 29 to reverse the operative condition of binary selective gate 29 and thereby condition the stage reset gate circuit 33 for operation in place of the excitation gate circuit 32.

The delay and inverter means 27 is provided to enable the binary counter 3 of unit 1 to complete its operation in response to the ninth pulse before the condition of the gate circuits 32 and 33 is reversed, and to change the positive voltage received from the matrix 4 to a negative voltage necessary to reverse the operative condition of the binary selective gate 29. A later detailed description of the binary selective gate 29 will indicate why this conversion is required. Details of structure and operation of the voltage pulse delay and inverter means 27 will be supplied later in this writing.

The binary equivalent of the decimal 9 is now stored in the binary counter 3 of unit 1. The binary equivalent of the decimal 0 remains stored in the binary counter 3 of unit 2. Neon tubes N0 of unit 2 and N9 of unit 1 are ionized, and the reset gate circuit 33 is conditioned for operation. The tenth pulse, therefore, actuates gate circuit 33 to transmit a negative pulse to reset conductor 22 which is electrically connected to each stage of the binary counter 3 of unit 1, as shown in Fig. 1*a*, and to the excitation conductor 21 of the first stage 6 of the binary counter of unit 2, as shown in Figs. 1*b* and 2. As will be fully described in detail later, the binary counter 3 of unit 1 is thereby reset to zero and the binary equivalent of the decimal 1 is stored in the binary counter 3 of unit 2. The resetting of the binary counter 3 of unit 1 to zero causes a predetermined voltage to be established on output conductor B0 of the matrix 4 of unit 1. The predetermined voltage thus applied to output conductor B0 is sufficient to pass through the first buffer means 26 to the delay and inverter means 27 from which a negative pulse is transmitted to the binary selective gate 29 to again reverse its operative condition. Thus, the excitation gate circuit 32 is now conditioned for operation in place of gate circuit 33.

The 11th through the 18th pulses successively store the binary equivalent of the decimals 1–8 in the binary counter 3 of unit 1. The 19th pulse causes the operative condition of the binary selective gate 29 to be reversed through the application of a predetermined positive voltage to output conductor B9 of matrix 4 of unit 1 thereby conditioning the reset gate circuit 33 for operation. The 20th pulse actuates reset gate circuit 33 to reset the binary counter 3 of unit 1 to zero and store an additional count in the binary counter 3 of unit 2. The binary equivalents of the decimals 2 and 0 are now stored respectively in the binary counters 3 of units 2 and 1.

Resetting of the binary counter 3 of unit 1 to zero again reverses the operative condition of the binary selective gate 29 to condition the excitation gate circuit 32 for operation in place of gate circuit 33. The 21st pulse actuates the gate circuit 32 to store the binary equivalent of the decimal 1 in the binary counter 3 of unit 1. The condition now for 21 counts is the binary equivalent of the decimal 2 stored in the binary counter 3 of unit 2 and the binary equivalent of the decimal 1 stored in the binary counter of unit 1. Neon tubes N2 of unit 2 and N1 of unit 1 are therefore ionized as predicted and the control operation is correct.

A consideration of the operation of units 1 and 2 to count in other selected radices up to 16 will indicate that the binary counters 3 are cooperatively arranged to count in any selected base and to indicate the digit characters of the number counted by a predetermined voltage established on a particular output conductor of each matrix and indicated on associated ones of the indicating panels 5. The voltage relation of the output conductors B0–B15 of the matrices 4 may also be used to actuate another machine such as a digital calculating machine or a portion thereof, if desired, in which case the indicating panels are omitted and the output conductors B0–B15 are electrically connected to the machinery to be controlled.

To increase the range of radices in which a count may be made the number of stages of each of the counters 3, the number of inputs and outputs of the matrices 4 and the number of contacts of the multiposition switches 23 are correspondingly increased depending upon the range of radices selected, and an appropriate number of additional impedances are added to properly interconnect the additional input and output conductors added to the matrices 4.

The combination of units 1 and 2 as above described and as diagrammatically shown in Fig. 2 is satisfactory where the number count may be expressed in two digits. In the event that additional digits are required to express the number count, an additional intermediate unit identical to unit 1 and an additional inverter means are required for each additional digit.

For example, in Fig. 3 I have shown in diagrammatical form a combination of three units, namely, 1, 1*a* and 2, suitable for number counts requiring three digits to express the same. Unit 1 of Fig. 3 is identical to unit 1 shown in Fig. 1*a*. Intermediate unit 1*a* is also identical to unit 1, and unit 2 is identical to unit 2 shown in Fig. 1*b*. Units 1 and 2 of Fig. 3 are electrically connected to the negative C supply indicated, reset conductor 37, and switches 36 and 38 identically as described for units 1 and 2 shown in Fig. 2. Unit 1*a* and a conventional voltage pulse inverter 28 are electrically connected between units 1 and 2 by electrically connecting the voltage inverter 28 between the stage reset conductor 22 of unit 1 and the conductor 35*a* of unit 2, which corresponds to conductor 35 of identical unit 1, and by electrically connecting the stage reset conductor 22*a* of unit 1*a*, which corresponds to conductor 22 of identical unit 1, to the excitation conductor 21 of unit 2, as shown in Fig. 3. Units 1, 1a and 2 are electrically connected to a +B supply, as shown in detail in Fig. 1*a* for unit 1.

Units 1 and 1*a* of Fig. 3 operate in the same manner as described for unit 1, shown in detail in Fig. 1*a*, and unit 2 operates in the same manner as described for unit 2, shown in detail in Fig. 1*b*. That is, the selective switches 23 of units 1 and 1*a*, shown in detail in Fig. 1*a*, are each set to correspond to the selected radix. Switch 38 is momentarily opened to reset the binary counters of units 1, 1*a* and 2 to zero and to set the binary selective gate of units 1 and 1*a* to a predetermined operative condition in which the gate circuits 32 of units 1 and 1*a* are conditioned for operation. Switch 36 is closed to actuate the binary counter 3 of unit 1 which operates through one complete cycle of binary characters corresponding to the selected radix before being reset to zero by operation of the binary selective gate 29 of unit 1. Since the reset of the binary counter 3 of unit 1 is accomplished by a negative pulse on the stage reset conductor 22 thereof, a negative pulse is thus available for operation of the binary counter 3 of unit 1*a*. However, unit 1*a* being identical to unit 1 requires a positive voltage on its conductor 35*a* for operation of the binary counter 3 thereof. Therefore, the inverter 28 is electrically connected between reset conductor 22 of unit 1 and conductor 35*a* of unit 1*a*. Unit 1*a* operates in response to each reset operation of the binary counter 3 of unit 1 for a complete cycle of binary characters corresponding to the selected radix and is then reset to zero by operation of the binary selective gate 29 of unit 1*a*.

Each reset operation of the binary counter 3 of unit 1*a* is accomplished by a negative pulse on its stage reset conductor 22*a* which is electrically connected directly to the excitation conductor 21 of the binary counter 3 of unit 2. An additional voltage inverter is not required in electrically connecting unit 1*a* to unit 2 because unit 2 has no gate circuits to cause voltage pulse inversion and, therefore, the negative pulse required on conductor 21 of unit 2 can be supplied directly from the stage reset conductor 22*a* of unit 1*a* which is negatively biased on reset operation of the binary counter 3 of unit 1*a*. Thus, by adding the intermediate unit 1*a* and the voltage inverter 28, numbers requiring three digits for expression thereof in the selected radix may be counted, unit 1 corresponding to the first digit, unit 1*a* to the second digit, and unit 2 to the third digit of the number counted.

The identical units 1 and 1*a* may also be electrically interconnected as shown in Fig. 4 to determine the least residue of a given number to a selected modulus. It will be noted by comparison of Figs. 3 and 4 that units 1 and 1*a* of Fig. 4 are electrically interconnected identically as shown in Fig. 3 and previously described. Unit 2 is omitted. However, the operation of the units 1 and 1*a* is slightly varied to determine least residue.

For example, assume that the least residue of the decimal 85 of the modulus 35 is to be determined. 85 is divisible by 35 twice with a least residue of 15. To determine the least residue by operation of units 1 and 1*a*, shown in Fig. 4, the selective switch 23 of unit 1 is set at R7 and the selective switch 23 of unit 1*a* is set at R5. That is, 7×5 equals 35, the selected modulus. Thereafter, operation of the units is identical as described for units 1 and 1*a* of Fig. 3. That is, the switch 38 is momentarily opened to reset the binary counters 3 of units 1 and 1*a* to zero and to reset the binary selective gates 29 of units 1 and 1*a* to the particular operative condition in which gated amplifier 32 is conditioned for operation. Switch 36 is closed to apply a number of positive pulses corresponding to the number count 85 to unit 1.

For each seven counts as determined by the setting of selective switch 23 of unit 1 to R7, the binary counter 3 of unit 1 is reset to zero. For each reset operation of the binary counter 3 of unit 1, a negative pulse is transmitted through the reset conductor 22 of the binary counter 3 of unit 1 to the voltage inverter 28 interconnecting units 1 and 1*a*. The negative voltage received by inverter 28 is changed to a positive voltage by the inverter and applied to conductor 35*a* of unit 1*a* to operate the binary counter 3 of unit 1*a*. For each five voltage pulses received by unit 1*a* from unit 1, corresponding to 5×7 or the selected modulus 35, the binary counter 3 of unit 1*a* is reset to zero.

Therefore, in the given example of the number 85 after five reset operations of the binary counter 3 of unit 1, corresponding to the count 35, the binary counter 3 of unit 1*a* is reset to zero. After ten reset operations of the binary counter 3 of unit 1, corresponding to the number 70, the binary counter 3 of unit 1*a* is again reset to zero. For the twelfth reset operation of the binary counter 3 of unit 1, corresponding to the number 84, the binary counter 3 of unit 1*a* has the binary character 0010 corresponding to the decimal 2 stored therein and the binary counter 3 of unit 1 has been reset to zero. On the eighty-fifth pulse, the binary character 0001 corresponding to the decimal 1 is stored therein.

The binary characters 0010 and 0001 are now respectively stored in the binary counters 3 of units 1*a* and 1. Reference to the tabulated table previously provided indicates that neon tubes N2 and N1 of respective units 1*a* and 1 are now ionized. Neon tube N2 of unit 1*a* indicates that in the least residue there are two 7 digits, that is, 2×7 or the decimal 14. Neon tube N1 of unit 1 indicates that there is an additional count of 1 in excess of that indicated by unit 1*a*. Adding the one additional count to the two 7 units, the total of 1 plus 2×7 or 15 is obtained. Thus, the least residue of 85 to the modulus 35 is obtained and visually indicated on the panels 5.

Obviously various other combinations for the selected modulus may be used in setting the switches 23 as long as the product of the settings is equal to the modulus selected. For example, with respect to modulus 35, if desired, switch 23 of unit 1 can be set at R5 and switch 23 of unit 1*a* set at R7 to produce the same result.

The number of units required to determine the least residue of a number to a given modulus depends upon the number of digits required to express the least residue. Where the least residue may be expressed in one digit, only unit 1 is required. If the least residue requires three digits for expression, then an additional unit identical to units 1*a* and 1 is required.

Thus far, I have described the structure of unit 2 and identical units 1 and 1*a* only in detail sufficient to describe how particular combinations of the units may be used to produce selective electronic mechanism for counting numbers in each of a plurality of radices and for developing voltage signals dependent upon the radix of count selected and to describe how another combination of identical units 1 and 1*a* may be used to determine the least residue of a number to a selected modulus and provide voltage signals indicating the least residue determined.

For further details of structure and operation of identical units 1 and 1*a* and unit 2 and with particular reference to the binary counter 3, the gate circuits 32 and 33, the binary selective gate 29, and the voltage pulse delay and inverter means 27 in the order mentioned, attention is now referred to Fig. 1*a* of the drawing. As shown in Fig. 1*a*, each of the stages 6–9 of the binary counters 3 comprises a conventional flip-flop or other suitable two-state double output circuit. For example, a conventional flip-flop circuit 40, shown in detail in stage 6 of the binary counter 3, is used in each of the stages 6–9. Circuit 40 comprises two grid biased electronic tubes 41 and 42, tube 41 having an anode 43, grid 44 and cathode 45 and tube 42 having an anode 46, grid 47 and cathode 48. The anodes 43 and 46 are electrically connected through respective resistance elements 49 and 50 to a source of positive voltage, +B supply, indicated. The cathodes 45 and 48 are electrically connected to ground as indicated. The anode 46 of tube 42 is electrically connected through a resistance 51 and capacitance 52 to the grid 44 of tube 41, and the anode 43 of tube 41 is electrically connected through a resistance 53 and a capacitance 54 to the grid 47 of tube 42. The output conductors 10 and 11 of each of the circuits 40 are electrically connected to the respective anodes 46 and 43.

It is assumed that to represent in each of the stages 6–9 the binary character 0 tube 41 is made conductive and tube 42 non-conductive in each of the flip-flop circuits 40 thereby applying positive voltage to output conductors 10 and a voltage negative relative thereto to output conductors 11. The reverse condition of tube 42 conductive and tube 41 non-conductive, that is, output conductor 11 positive and output conductor 10 negative relative thereto, is assumed to represent the binary character 1 in each of the flip-flop circuits 40.

To control the operation of each of the circuits 40 and hence the voltage potential on output conductors 10 and 11, the grid 44 of each of the tubes 41 is electrically connected through a resistor 55 and conductor 56 to the reset line 37. The grid 47 of each of the tubes 42 is electrically connected through a resistor 57 and a conductor 58 to the negative C supply indicated. The grids 44 and 47 of the tubes 41 and 42 are electrically connected respectively through a pair of diodes 59 and 60 to a common source of excitation. The source of excitation for circuit 40 of stage 6 is the excitation conductor 21. The source of excitation for the circuits 40 of each of the following stages 7–9 is the anode 43 of the tube 41 of the previous stage to which the diodes 59 and 60 are electrically connected through a capacitor 61 and conductors 62 and 63. Thus, for example, grids 44 and 47 of respective tubes 41 and 42 of stage 7 are electrically connected through respective diodes 59 and 60 and the common capacitor 61 to the anode 43 of tube 41 of stage 6. Each of the capacitors 61 is electrically connected to a ground indicated through a resistor 64. As will be described in detail later, the operating condition of tubes 41 and 42 of each of the circuits 40 is reversed to reverse the voltage relation of the outputs 10 and 11 thereof whenever a negative voltage pulse is received by the particular one of the circuits 40 from its particular excitation source thereby changing the binary character represented in that circuit to the opposite binary character.

To reset each of the stages 6–9 to represent the binary character 0 therein in response to the operation of the binary selective gate 29, the grids 47 of the circuits 40 are electrically connected each through a diode 65 to the stage reset conductor 22 which is electrically connected to the gate circuit 33.

The excitation coincidence gate circuit 32 and the stage reset coincidence gate circuit 33 are identical, each circuit comprising an electronic tube 66 having an anode 67, grids 68, 69 and 70, and a cathode 71. The cathodes 71 are grounded as indicated. The anodes 67 are electrically connected each through an associated resistor 72 to the +B supply indicated. The grids 68 are electrically connected through the common conductor 35 and the common switch means 36 to a source of continuous positive pulse flow. The grids 69 are electrically connected to a source of positive direct current voltage bias indicated. The grids 70 of tubes 66 of circuits 33 and 32 are electrically connected each through an associated resistor 73 to the respective outputs 31 and 30 of the binary selective gate 29. The grids 70 are also electrically connected each through a resistor 74 to the negative C supply source indicated. The anode 67 of tube 66 of circuit 33 is electrically connected through a capacitor 75 to a grounded resistor 76 and to the stage reset conductor 22. The anode 67 of tube 66 of circuit 32 is electrically connected through a capacitor 75 to a grounded resistor 76 and to the excitation conductor 21. The tubes 66 are each operable to conductive condition when a positive voltage is applied to the grids 68 and 70 thereof. Positive voltage pulses are continuously supplied simultaneously to the grids 68 of the circuits 32 and 33. However, positive voltage is supplied to grid 70 of circuit 33 or to grid 70 of circuit 32 through the respective output conductors 31 and 30 of the binary selective gate 29 dependent upon the operation condition of the gate, but never are both conductors 30 and 31 simultaneously of positive polarity.

When the output conductor 31 of the gate 29 is of positive polarity, tube 66 of circuit 33 operates in response to a positive pulse applied to its grid 68 from the source of continuous positive pulse flow. Operation of tube 66 of circuit 33 lowers the voltage of anode 67 and produces a negative voltage pulse on the reset conductor 22. When the output conductor 30 of the gate 29 is of positive polarity, tube 66 of circuit 32 operates in response to a positive pulse applied to its grid 68 from the source of continuous positive pulse flow thereby lowering the voltage of its anode 67 and producing a negative voltage pulse on the excitation conductor 21.

The binary selective gate 29 consists of a flip-flop circuit 77 identical to the flip-flop circuit 40 shown in stage 6 of the binary counter 3 except for the omission of elements denoted by numerals 61–64 and 65 in circuit 40. Elements 61–64 are omitted because excitation for a succeeding stage is not required, there being only one flip-flop circuit in the selective gate 29. The element 65 is omitted because stage reset operation of the selective gate is not needed. The elements of flip-flop circuit 77 for simplicity of description are therefore given the same character references applied to circuits 40 of stages 6 and 7 with the exception that the output conductors are numbered 30 and 31 to distinguish from output conductors 10 and 11 of the circuits 40, the excitation conductor of flip-flop circuit 77 is numbered 78 to distinguish from the excitation conductor 21 of the binary counters 3, and the grid biasing conductors 56 and 58 of circuits 40 are numbered 79 and 80, respectively, in circuit 77.

The excitation conductor 78 is electrically connected to the voltage pulse delay and inverter means 27 to receive a negative voltage therefrom. The voltage relation of outputs 30 and 31 of selective gate 29 and hence the operative condition of gate circuits 32 and 33 are controlled by the condition of the tubes 41 and 42 in the flip-flop circuit 77. That is, when tube 41 is conducting and tube 42 is in non-conductive condition, output 30 is positive and output 31 negative relative thereto. Conversely when tube 41 is in non-conductive condition and tube 42 is conductive, output 30 is negative relative to output 31 which is at a positive value.

Two means of control are provided for the tubes 41 and 42 of circuit 77. One means of control to reverse the conductive condition of the tubes 41 and 42 is the excitation input 78 through which a negative voltage pulse is introduced from the delay inverter means 27 to the grids 44 and 47 of the respective tubes 41 and 42. For example, if tube 42 is conducting and tube 41 is in non-conducting condition, a negative voltage pulse impressed on the grids 44 and 47 through the excitation input 78 has no immediate effect on tube 41 because it is not conducting, and a negative voltage on its grid therefore has no effect. However, a negative voltage pulse applied to grid 47 of tube 42 interrupts conduction in tube 42. Moreover, when the conductivity of tube 42 is interrupted, its anode voltage rises to a more positive value thereby impressing a more positive voltage on the grid 44 of tube 41 to produce conduction in the latter. Thus, the condition of conduction of tubes 41 and 42 is reversed thereby reversing the positive and negative relation of the outputs 30 and 31. In the same manner, if tube 41 is conducting and tube 42 non-conductive, a negative pulse through excitation conductor 78 reverses the conductive condition of the tubes 41 and 42.

As a second means of control and to produce the particular desired relation of tube 41 conductive and tube 42 non-conductive, a negative voltage bias is removed from input conductor 79 and grid 44 of tube 41 by momentarily opening the switch 38. For example, if tubes 41 and 42 are in the desired state of tube 41 conductive and tube 42 non-conductive, the removal of negative bias from the grid 44 of tube 41 aids in continuing the condition of tube 41 conductive. Therefore, no change in the condition of tubes 41 and 42 results. However, if the tubes 41 and 42 are in the reverse relation of tube 41 non-conductive and tube 42 conductive, the grid 44 of tube 41 is maintained at the same potential, that is, negative with respect to ground, by being electrically connected between the negative C supply indicated and the positively biased anode 46 of tube 42. However, when the switch 38 is opened, the negative C supply bias is thereby removed from the grid 44 of tube 41 and grid 44 becomes sufficiently positive to initiate conduction in tube 41. When tube 41 becomes conductive, the voltage on anode 43 thereof is lowered thus lowering the voltage on grid 47 to interrupt conductivity in tube 42.

Thus, the binary selective gate 29 is responsive to negative voltage pulses from the delay inverter means 27 to reverse the voltage relation of its output conductors 30 and 31 to control the gate circuits 32 and 33 and, further, is operable in response to an interruption of negative voltage on its input 79 caused by a momentary opening of the switch 38 to produce positive voltage on its output 30 and a negative voltage relative thereto on its output 31.

The function of the coincidence gate circuits 32 and 33 is to receive through conductor 35 and switch 36 positive voltage pulses from the source of continuous positive pulse flow indicated and produce negative voltage pulses either on the stage reset conductor 22 or the excitation conductor 21 depending upon the character positive or negative of voltage bias from selective gate 29 on each of the circuits 32 and 33. For example, if the output 31 of the selective gate 29 is positive, circuit 33 operates in response to a voltage pulse from the source of continuous pulse flow to produce a negative pulse on the stage reset conductor 22. If in selective gate 29 the output 30 is positive and output 31 negative, circuit 32 operates to produce a negative pulse on excitation conductor 21 in response to a positive pulse received from the source of continuous pulse flow. At no time will both circuits 32 and 33 operate simultaneously because outputs 30 and 31 are always one positive and the other negative.

The gate circuits 32 and 33, in response to positive voltage pulses applied thereto from the source of continuous positive pulse flow indicated and the bias thereof by the selective gate 29, control the operation of the binary counter stages 6–9. For example, when a negative pulse is received from gated amplifier 32, such pulse is transmitted through the excitation conductor 21 and the diodes 59 and 60 to the grids 44 and 47 of the respective tubes 41 and 42 of stage 6. The negative pulse thus applied to the grids of tubes 41 and 42 of stage 6 causes a reversal of conductive condition in the tubes in the same manner previously described with respect to the operation of tubes 41 and 42 of the selective gate 29 upon pulsing of the excitation conductor 78. Further, by reversing the conductive condition of tubes 41 and 42, the voltage relation of output conductors 10 and 11 is reversed. That is, if the original condition is tube 41 conductive and tube 42 non-conductive thereby establishing the relation of output conductor 11 negative and output conductor 10 positive, and the excitation conductor 21 is pulsed negatively, tube 41 is thereby made non-conductive and tube 42 is made conductive establishing the relation of output 11 positive and output 10 negative.

The following stages 7–9 are each excited by negative pulses in response to and depending upon particular operation of the previous stage. For example, if the condition of flip-flop circuit 40 in stage 6 is tube 41 conductive and tube 42 non-conductive and the condition of the tubes is reversed interrupting the conductivity of tube 41, a positive pulse is produced by an increase in the voltage of anode 43 of tube 41. The positive pulse thus produced in stage 6 is not transmitted to the grids 44 and 47 of the respective tubes 41 and 42 of stage 7 because diodes 59 and 60 will not conduct in the reverse direction. On the other hand, if tube 41 of stage 6 is reversed from non-conductive to conductive condition, the anode voltage thereof is lowered producing a negative pulse which is transmitted to the grids 44 and 47 of the respective tubes 41 and 42 of stage 7 through conductor 63, capacitor 61, conductor 62 and either diode 59 or diode 60. In this case, the negative pulse interrupts conductivity in the tube which is conducting, tube 41, for example, thereby increasing its anode voltage and applying a positive pulse to the grid of the tube which is in non-conductive condition, tube 42, for example, causing the non-conducting tube to become conductive.

Thus, the tubes of each succeeding stage are excited by a particular reversal of conductive condition of the tubes in the preceding stage and are themselves reversed only when the tubes of the preceding stage reset to the zero condition as previously described. The flip-flop circuits 40 are insensitive to positive pulse excitation and therefore reverse only when negative pulses are applied.

The voltage pulse delay and inverter means 27 is provided to receive a positive voltage signal from the matrix 4 through a particular one of the diodes 26 and 34 depending upon the operative condition of its associated counter 3, and to transmit a negative voltage signal after a time delay to the binary selective gate to reverse the operative condition of the same. Delay is required to allow the counter 3 sufficient time to complete its operation in response to one voltage pulse before the binary selective gate 29 is changed to call for a different operation. The inversion from positive to negative voltage signal is required because circuit 78 of the binary selective gate 29 is operable to reverse the polarity of its outputs 30 and 31 only in response to a negative voltage.

The voltage pulse delay and inverter means 27 comprises a pair of electronic tubes 81 and 82 having respectively anodes 83 and 84, grids 85 and 86, and cathodes 87 and 88. The anodes 83 and 84 are electrically connected through respective resistors 89 and 90 to a +B supply indicated. The grid 85 is electrically connected to a grounded resistor 91 and through a capacitor 92 to the diodes 34 and 26. The grid 86 is electrically connected through a resistor 93 to the +B supply indicated. The anode 83 is electrically connected through a capacitor 94 to the grid 86. The anode 84 of tube 82 is electrically connected through a capacitor 95 to a grounded resistor 96, a grounded unidirectional conducting means such as grounded diode 97 and to the excitation conductor 78 for the binary selective gate 29. The cathodes 87 and 88 are electrically connected through a common resistor 98 to ground indicated.

In operation of the voltage pulse delay and inverter means 27, a predetermined positive voltage is received by grid 85 of tube 81 of the inverter means 27 causing a rapid lowering of potential on anode 83 of tube 81. By lowering the potential of anode 83, the potential of grid 86 of tube 82 connected to anode 83 of tube 81 through the capacitor 94 is also lowered thereby tending to stop the flow of plate current in tube 82. By reason of the common cathode coupling resistor 98, the effect of reduction of plate current of tube 82 is to increase the plate current of tube 81 thereby causing a further lowering of potential of anode 83 of tube 81 and thence of grid 86 of tube 82. The sequence of events described above and which I shall hereinafter refer to as the loop switching process continues until tube 82 is in non-conductive condition and tube 81 is in a stable conducting state. The time required for switching is of sufficiently short duration that effectively no change in the potential across capacitor 94 results. When the switching process has been completed, however, the capacitor 94 begins to discharge through resistor 93 and the parallel circuits formed of resistor 89, and tube 81 with its associated cathode resistor 98. As the capacitor 94 discharges, the potential of grid 86 is raised in a positive direction from a negative peak until, at a time determined by the time constant of the circuit comprising capacitor 94, resistors 93 and 89, tube 81 and cathode resistor 98 and by the potentials involved, the potential of grid 86 reaches a voltage level sufficient to permit conduction in tube 82. When this level of potential of grid 86 is reached, switching occurs in the reverse direction to that described above and terminates with tube 82 conductive and tube 81 non-conductive. No further switching obtains thereafter until the delay and inverter means 27 is excited by application of another pulse to grid 85 of tube 81.

When tube 82 is made non-conductive at the beginning of the switching cycle, the potential of anode 84 of tube 82 is raised thereby tending through capacitor 95 to raise the potential on line 78. However, because of diode 97 the potential of line 78 cannot be raised above ground potential, and therefore capacitor 95 is charged through resistor 90 to the potential of the +B supply or some function thereof.

When the potential of anode 84 of tube 82 is lowered at the end of the switching cycle, the coupling of anode 84 through capacitor 95 to line 78 causes the potential of line 78 to be lowered with lowering of the potential of anode 84, thereby producing a negative pulse on line 78. Since the potential across diode 97 is negative, it cannot conduct and therefore cannot load anode 84. Thus, means 27 in operation acts as a delay means by reason of its switching cycle and as a voltage inverter means in that a negative voltage pulse is supplied to line 78 in response to a positive pulse received by grid 85 of tube 81.

To show the operation of the binary counters 3 in detail in response to a series of negative voltage pulses received on excitation conductor 21 from gate circuit 32, assume that the binary counter 3 shown in Fig. 1*a* has been reset to zero. The binary number 0000 is now stored in stages 6–9 of the counter 3 as indicated by tubes 41 conductive and tubes 42 non-conductive. The first negative pulse received by excitation conductor 21 is transmitted through diodes 59 and 60 to the grids 44 and 47 of the respective tubes 41 and 42 of stage 6 to reverse the operative condition of the tubes as previously described. Thus, the binary digit 1 is stored in stage 6. The interruption of conductivity in tube 41 of stage 6 produces a positive pulse through conductor 62 to stage 7. However, as previously described, a positive pulse received by stage 7 from stage 6 has no effect on the operative condition of the tubes 41 and 42 in stage 7. Therefore, the binary digit 0 remains stored in stage 7. Moreover, since the operative condition of tubes 41 and 42 of stage 7 is not reversed, no voltage signal is received by stages 8 and 9, and therefore the binary digit 0 remains stored in stages 8 and 9. The binary number 0001 is now stored in the binary counter 3.

The next negative pulse on excitation conductor 21 again reverses the operative condition of tubes 41 and 42 in stage 6 to store the binary digit 0 therein. The initiation of conduction of tube 41 by reversing the operative condition of tubes 41 and 42 of stage 6 lowers the voltage on anode 43 of tube 41 to produce a negative pulse on grids 44 and 47 of respective tubes 41 and 42 of stage 7 thereby reversing the operative condition of tubes 41 and 42 of stage 7 to store the binary digit 1 in stage 7. Reversal of the operative condition of tubes 41 and 42 of stage 7 produces a positive voltage pulse on stage 8 producing no change in the operative condition of tubes 41 and 42 (not shown) of stage 8. Therefore, a binary digit 0 remains stored in stages 8 and 9. The binary number 0010 is now stored in the binary counter 3.

By following the operation of the binary counter 3 in the above manner for additional negative voltage pulses applied to the excitation conductor 21, it is seen that successive binary numbers are stored in the counter 3 in response to a series of negative pulses on the excitation conductor 21.

To show in detail the operation of the binary counter 3 for stage reset operation, that is, the operation in which the binary counter 3 is reset to zero after it has operated through all the possible digit characters corresponding to the radix, attention is again referred to Fig. 1*a* of the drawing. When the stage reset conductor 22 is negatively pulsed from the gate circuit 33, a negative pulse is applied to the grid 47 of tube 42 of each of the stages 6–9 through diodes 65. The negative pulse thus applied to the grids 47 of the tubes 42 is sufficient to interrupt conductivity of the tubes 42 if they are in conductive state thereby initiating conductivity in the tubes 41 of stages 6–9. If a particular tube 42 is not conducting, a negative voltage on its grid merely aids in preventing conduction. Thus, of the pairs of tubes 41 and 42 in the stages 6–9, those which are in the condition of tube 42 conductive and tube 41 non-conductive are reversed to make tube 41 conductive and tube 42 non-conductive. The latter condition which places a positive voltage on output 10 and a negative voltage on output 11 in each of the stages 6–9 is representative of the binary character 0 stored in each unit. Therefore, the binary counters 3 are reset to zero in response to a negative voltage pulse received from its associated stage reset gate circuit 33.

To show in detail the operation of the binary counters 3 and the binary selective gate 29 in response to manual operation of the switch 38 causing all of the binary counters 3 to be reset to zero and causing the binary selective gate 29 to be reset to the particular condition in which its output conductor 30 is made positive to condition the gate circuit 32 for operation, attention is referred to Figs. 1*a*, 2, 3 and 4.

As shown in detail in stages 6 and 7 of Fig. 1*a*, the grids 44 of the tubes 41 of all of the circuits 40 of the binary counters 3 are electrically connected through grid conductors 56 to the common reset conductor 37, and the grid 44 of tube 41 of circuit 77 of the binary selective gate 29 is electrically connected to the reset conductor 37 through the grid conductor 79. As shown in Figs. 2–4, the conductor 37 is electrically connected through the reset switch 38 to the negative C supply indicated. Therefore, by momentarily opening the switch 38, a negative bias on grids 44 of tubes 41 of circuits 40 and 77 is momentarily removed.

Assume that in each stage of the binary counters 3 is stored the binary digit 1 represented by tube 42 conductive and tube 41 non-conductive. Assume further that in the binary selective gate 29 the same condition prevails, that is, tube 42 is conductive and tube 41 non-conductive. To reset the binary counters 3 to zero, the operative condition of tubes 41 and 42 must be reversed. Also, to set the binary selective gate 29 to condition gate circuit 32 for operation, the condition of tubes 41 and 42 in circuit 77 must be reversed.

By opening the switch 38, grids 44 are made sufficiently positive to cause tubes 41 to become conductive. When tubes 41 become conductive, the voltage on anodes 43 thereof is lowered, thus lowering the voltage on grids 47 of tubes 42 to interrupt the conductivity of tubes 42. Thus, in circuits 40, tubes 41 are made conductive and tubes 42 non-conductive thereby resetting the binary counters 3 to zero. In circuit 77 since tube 41 is made conductive and tube 42 non-conductive, the binary selective gate 29 is reset to the desired condition in which circuit 32 is conditioned for operation. Thus, by a momentary opening of the switch 38, all of the binary counters 3 are reset to zero and the binary selective gate 29 is reset to a desired condition.

A brief review of the specification at this point will indicate that details of structure and operation of the binary counters 3, the binary selective gate 29, the gate circuits 32 and 33, and the voltage pulse delay and inverter means 27 omitted for simplicity of description in describing the general operation and suitable combinations of basic units 1 and 2 have now been supplied.

Unidirectional buffer means 34 and 26 shown in Fig. 1*a* are electrically connected through a resistor 99 to a source of suitable bias indicated by SB to permit excitation of the delay inverter means 27 only when a predetermined positive voltage developed in the matrix 4 is applied to buffer means 34 or 26.

Referring to Fig. 5 as a modification of my invention, I provide for the units 1 a binary selective gate 100 and a double output coincidence gate circuit 101 to replace the binary selective gate 29 and coincidence gate circuits 32 and 33 of unit 1 shown in Fig. 1*a*.

The binary selective gate 100 is identical to the binary selective gate 29 shown in detail in Fig. 1*a* except for the replacement of output conductors 30 and 31 by a pair of output conductors 102 and 103 which are electrically connected respectively to the grids 44 and 47 of the tubes 41 and 42. The same character references as applied to the binary selective gate 29 are used for the remainder of the elements of the binary selective gate 100. The excitation conductor 78 of the binary selective gate 100 is electrically connected to the delay inverter means 27, as shown in Fig. 1*a*, to receive a negative voltage signal therefrom. The binary selective gate 100 operates in response to a negative pulse applied to its excitation conductor 78 to reverse the operative condition of its tubes 41 and 42 as previously described for selective gate 29. When the tubes 41 and 42 of the binary selective gate 100 are in the condition of tube 41 conductive and tube 42 non-conductive, the grid 44 and therefore the output conductor 102 electrically connected thereto are at substantially ground potential. The grid 47 of tube 42 and therefore the output conductor 103 electrically connected to the grid 47 are at a potential substantially below ground. When the condition of the tubes 41 and 42 of the binary selective gate 100 is reversed, the voltage potential of outputs 102 and 103 is reversed. As will be described in detail presently, the reversal of potential on the outputs 102 and 103 in response to the operation of the binary selective gate 100 is used to control the operation of the double output coincidence gate circuit 101.

The double output coincidence circuit 101 comprises a first pair of diodes 104 and 105, a common resistor 106, a pair of resistors 107 and 108, a second pair of diodes 109 and 110, a pair of grid biased input conductors 113 and 114, a capacitor 115 and a voltage pulse input conductor 116.

The first pair of diodes 104 and 105 are electrically connected through the common resistor 106 to the +B supply indicated. The diode 104 is electrically connected through the resistor 107 to the −C supply indicated. The diode 105 is electrically connected through the resistor 108 to the −C supply indicated. The output conductor 111 is electrically connected to the excitation conductor 21 of the binary counter 3 and to the coincidence circuit 101 at a point 117 electrically positioned between the diode 104 and the resistor 107. The output conductor 112 is electrically connected to the stage reset conductor 22 of the binary counter 3 and to the coincidence circuit 101 at a point 118 electrically positioned between the diode 105 and the resistor 108. The grid biased input conductor 113 is electrically connected to the output conductor 102 of the binary selective gate 100 and to the coincidence gate circuit 101 at point 118 through the diode 110. The grid biased input conductor 114 is electrically connected to the output conductor 103 of the binary selective gate 100 and to the coincidence gate circuit 101 at point 117 thereof through the diode 109. The diodes 104 and 105 are electrically connected through the capacitor 115, the input conductor 116, and the switch 36 to a source of continuous negative pulse flow.

Considering the employment of the binary selective gate 100 and the double output coincidence circuit 101 in place of the binary selective gate 29 and coincidence gate circuits 32 and 33, the binary selective gate 100 is operable, as is the binary selective gate 29, in response to a negative voltage applied to its excitation conductor 78 to reverse the operative conditions of the tubes 41 and 42 thereof and thereby reverses the polarity of its output conductors 102 and 103.

In the coincidence gate circuit 101, the points 117 and 118 are maintained at a voltage slightly below ground by current passing from the +B to the −C supply through the common resistor 106, diodes 104 and 105, and resistors 107 and 108 in the absence of a voltage pulse signal on input conductor 116.

Negative pulses in input conductor 116 from the source of negative voltage pulses are transmitted through capacitance 115 to the anodes 104*a* and 105*a* of the diodes 104 and 105 causing the anodes 104*a* and 105*a* to be negatively biased and tending to negatively increase the potential at points 117 and 118 of the coincidence gate circuit 101. In the absence of electric signals from the binary selective gate 100, an increase in negative voltage at points 117 and 118 of the coincidence circuit produces a negative pulse on the respective input conductors 21 and 22 of the binary counter 3. However, when the tubes 41 and 42 of the binary selective gate 100 are in the condition of tube 41 conductive and tube 42 non-conductive, tube 41 being conductive its grid 44 is at substantially ground potential. Therefore, reset conductor 22 connected to the grid 44 of tube 41 of the binary selective gate 100 through the conductive diode 110 cannot be reduced sufficiently below ground potential to effect a negative pulse on reset conductor 22. On the other hand, since tube 42 is in non-conductive condition, its grid 47 is substantially below ground potential and the diode 109 is negatively biased and non-conductive. Therefore, the negatively biased grid 47 of tube 42 of the selective gate 100 has no effect in stabilizing the voltage at point 117 and the voltage at point 117 is made more negative in response to a negative voltage pulse on input conductor 116, thereby producing a negative pulse on the excitation conductor 21 of the binary counter 3.

Thus, when the binary selective gate 100 is in the condition of tube 41 conductive and tube 42 non-conductive, the coincidence gate circuit 101 is actuated in response to a negative pulse on its input conductor 116 to produce a negative pulse on the excitation conductor 21 of the binary counter 3 to operate the same.

A detailed consideration of the effect of the binary selective gate 100 on the coincidence circuit 101 when gate 100 is in the reverse condition of tube 42 conductive and tube 41 non-conductive will indicate that the reset conductor 22 is then negatively pulsed in response to a negative pulse on the input conductor 116 of the coincidence circuit 101. Thus, in this modification of my invention, a use of the binary selective gate 100 and the coincidence gate circuit 101, control of excitation and reset operation of the binary counter 3 is provided in response to negative pulses from a source of continuous negative pulse flow instead of from a source of continuous positive pulse flow.

A consideration of the circuits shown in Figs. 3 and 4 will indicate the advantage of using a coincidence gate circuit responsive to negative voltage pulses. That is, reset operation is accomplished by a negative pulse on reset conductor 22. Therefore, when a gate circuit, responsive to positive voltage pulses such as circuits 32 and 33, is employed, a voltage inverter such as inverter 28 shown in Figs. 3 and 4 is required to charge the negative pulse of the reset conductor 22 to the positive pulse required to operate the circuits 32 and 33. However, when a circuit responsive to negative pulses, such as circuit 101, is employed, the inverter 28 may then be omitted.

Thus, by the modification of my invention illustrated in Fig. 5, a source of continuous negative pulse flow may be used instead of a positive pulse flow and voltage inverters 28 are eliminated.

Therefore, in accordance with my invention, I have provided a simple, reliable electronic counter readily adjustable by switch means to select one of a plurality of radices and rapidly count in the selected radix producing voltage signals of the count as it progresses. Further, by my invention, I have provided an electronic counter capable of producing voltage signals corresponding to the least residue of numbers to a selected one of a plurality of moduli.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. Apparatus for counting numbers in a selected one of a plurality of radices comprising a first and a second multistage binary counter for registering repeated voltage impulses as numbers, an electric matrix associated with said first binary counter and comprising input conductors connected with said first binary counter and having voltage patterns dependent on the binary numbers stored therein, output conductors, and impedance means interconnecting said input and output conductors for obtaining substantially the same predetermined voltage on a different one of said output conductors for each different voltage pattern of said input conductors, a selective switch for selecting any one of said output conductors of said matrix thereby to select a radix of count, a control circuit means connected to said first binary counter and to said switch and responsive to said predetermined voltage on said selected output conductor of said matrix for resetting said first binary counter after each cycle of radix count, and connections for electrically connecting said second binary counter to said control circuit means to register the number of reset operations of said first binary counter.

2. Apparatus for counting numbers in a selected one of a plurality of radices comprising a first and a second multistage binary counter for registering repeated voltage impulses as numbers, an electric matrix associated with each of said binary counters and comprising input conductors connected with its associated binary counter and having voltage patterns dependent on the binary numbers stored therein, output conductors, and impedance means interconnecting said input and output conductors for obtaining substantially the same predetermined voltage on a different one of said output conductors for each different voltage pattern of said input conductors, a selective switch for selecting any one of said output conductors of said matrix associated with said first binary counter thereby to select a radix of count, a control circuit means connected to said first binary counter and to said switch and responsive to said predetermined voltage on said selected output conductor of said matrix associated with said first binary counter for resetting said first binary counter to zero after each cycle of radix count, and connections for electrically connecting said second binary counter to said control circuit means to register the number of reset operations of said first binary counter.

3. Apparatus for counting numbers in a selected one of a plurality of radices comprising a first multistage binary counter for registering repeated voltage impulses as numbers, an electric matrix comprising input conductors connected with said first binary counter and having voltage patterns dependent on the binary numbers stored therein, output conductors, and impedance means interconnecting said input and output conductors for obtaining substantially the same predetermined voltage on a different one of said output conductors for each different voltage pattern of said input conductors, a selective switch for selecting any one of said output conductors thereby to select a radix of count, a control circuit means connected to said first binary counter and to said switch and responsive to said predetermined voltage on said selected output conductor of said matrix for resetting said first binary counter to zero after each cycle of the radix count, a second multistage binary counter electrically connected to said control circuit means to register the number of reset operations of said first binary counter, and a second electric matrix comprising input conductors connected with said second binary counter and having voltage patterns dependent on the binary numbers stored therein, output conductors, and impedance means interconnecting said input and output conductors for obtaining substantially the same predetermined voltage on a different one of said output conductors for each different voltage pattern of said input conductors.

4. Apparatus for counting numbers in a selected one of a plurality of radices comprising a first and a second multistage binary counter for registering repeated voltage impulses as numbers, an electric matrix associated with each of said binary counters and comprising input conductors connected with its associated binary counter and having voltage patterns dependent on the binary numbers stored therein, output conductors, and impedance means interconnecting said input and output conductors for obtaining substantially the same predetermined voltage on a different one of said output conductors for each different voltage pattern of said input conductors, a selective switch for selecting any one of said output conductors of its associated matrix thereby to select a radix of count, a control circuit means for resetting said first binary counter to zero after each cycle of radix count, said control circuit means comprising a pair of gated amplifying means, a binary selective gate, a voltage inverter and voltage pulse delay means, a pair of unidirectional buffer means connected in series parallel electric circuit between said selective switch means and said binary counter, and connections for electrically connecting said pair of gated amplifying means to a source of continuous pulse flow, and connections for electrically connecting said second binary counter to a particular one of said gated amplifying means to register the number of reset operations of said first binary counter.

5. Apparatus for counting numbers in a selected one of a plurality of radices comprising a first and a second multistage binary counter for registering repeated voltage impulses as numbers, an electric matrix for each of said counters comprising input conductors connected with its associated binary counter and having voltage patterns dependent on the binary numbers stored therein, output conductors, and impedance means interconnecting said input and output conductors for obtaining substantially the same predetermined voltage on a different one of said output conductors for each different voltage pattern of said input conductors, a selective switch for selecting any one of said output conductors of said matrix associated with said first binary counter thereby to select a radix of count, a control circuit means connected to said first binary counter and to said switch and responsive to said predetermined voltage on said selected output conductor of said matrix associated with said first binary counter for resetting said first counter to zero after each cycle of the radix count, connections for electrically connecting said second binary counter to said control circuit means to operate said second binary counter to register each reset operation of said first binary counter, means for actuating said first binary counter to register said repeated voltage impulses comprising an additional switch means and connections for connecting said control circuit means through said additional switch means to a source of repeated voltage impulses, and means comprising a reset conductor common to said binary counters and said control circuit means, a normally closed momentary opening switch electrically connected to said reset conductor, and connections for connecting said momentary opening switch to a source of negative voltage, for resetting said binary counters to zero and for resetting said control circuit means to a particular starting condition.

6. Apparatus for counting numbers in a selected one of a plurality of radices comprising a first and a second unit, each of said units comprising a multistage binary counter having a plurality of pairs of associated output conductors, connections for connecting said counter to a suitable power source, an electric matrix comprising a plurality of impedance means, and a plurality of input and output conductors electrically interconnected in a predetermined relation by said plurality of impedance means, connections for connecting said input conductors of said matrix in a predetermined relation to said output conductors of said binary counter to produce a predetermined voltage on a different one of said output conductors of said matrix for each different binary number stored in said binary counter, said first unit comprising in addition a pair of gated amplifying means, a binary selective gate, a voltage inverter means, a voltage pulse delay means, a pair of unidirectional buffer means and a multiposition selective switch means electrically connected in a predetermined relation between said binary counter and said output conductors of said matrix to control the operation of said binary counter dependent upon a setting of said multiposition switch corresponding to the selected radix of count, and means for actuating said binary counter of said first unit comprising an additional switch means common to said pair of gated amplifier means of said first unit, connections for connecting said pair of gated amplifying means through said common switch means to a source of continuous positive pulse flow, and said second unit comprising in addition means for actuating said binary counter therein comprising connections for connecting said first stage thereof to a particular gated amplifying means of said first unit, and means for resetting said binary counters of said units to zero and for resetting said binary selective gate of said first unit to a particular condition comprising a reset conductor common to said binary counters and said selective gate, a normally closed momentary opening switch electrically connected to said reset conductor, and connections for connecting said momentary opening switch to a source of negative voltage.

7. Apparatus comprising a multistage binary counter for registering repeated voltage impulses, an electric matrix for said binary counter comprising a plurality of output conductors, pairs of input conductors, each pair being connected to be responsive to the two voltage values of a different one of the stages of said binary counter, and impedance means connecting said input conductors of like voltage value from each stage of said binary counter to a different one of said output conductors for each different number registered in said binary counter and thereby producing a predetermined voltage on but one of said output conductors for each of said numbers registered, a selective switch for said binary counter for selecting any one of said output conductors of said matrix thereby to select a modulus, and a control circuit means connected to said binary counter and to said switch and responsive to said predetermined voltage on said selected output conductor of said matrix for resetting said binary counter to zero after each cycle of modulus count.

8. Apparatus comprising a multistage binary counter for registering repeated voltage impulses and having a plurality of pairs of associated output conductors, a stage reset and an excitation conductor for said binary counter and electrically connected thereto in a predetermined relation, a control circuit means comprising an electric matrix, a multiposition electric switch, a first and a second unidirectional buffer means, a voltage pulse delay means, a voltage inverter, a binary selective gate, an excitation amplifier and a stage reset amplifier electrically connected in a series parallel circuit between said output conductors of said binary counter and said stage reset and excitation conductors thereof, for resetting said binary counter to zero after each cycle of modulus count, means comprising an additional switch means common to said amplifiers of said control circuit means, and connections for connecting said stage reset conductor and said excitation conductor of said counter respectively through said stage reset amplifier and excitation amplifier and through said additional switch means to a source of repeated voltage impulses, for actuating said binary counter to register said repeated voltage impulses, and means comprising an additional reset conductor electrically connected in a predetermined relation to each stage of said binary counter and to said binary selective gate, a normally closed momentary opening switch, and connections for connecting said additional reset conductor through said momentary opening switch to a source of negative voltage for resetting said binary counter to zero and for resetting said binary selective gate to a particular starting condition in response to a momentary opening to said normally closed switch.

9. Apparatus for determining the least residue of a number to a selected modulus comprising a first and at least one additional multistage binary counter for registering repeated voltage impulses as numbers, an electric matrix individually associated with each of said binary counters and comprising input conductors connected with its said associated binary counter and having voltage patterns dependent on the binary numbers stored therein, output conductors, and impedance means interconnecting said input and output conductors for obtaining substantially the same predetermined voltage on a different one of said output conductors for each different voltage pattern of said input conductors, a selective switch individual to each of said matrices of said binary counters for selecting any one of said output conductors of its associated matrix thereby to select a modulus, a control circuit means for each counter connected thereto and to said switch associated with its said matrix and responsive to said predetermined voltage on said selected output conductor of its said matrix for resetting its associated one of said binary counters to zero after each cycle of radix count of that counter, and connections for electrically connecting each succeeding binary counter to the control circuit means of its preceding binary counter to register the number of reset operations of said preceding binary counter.

10. Apparatus for determining the least residue of a number to a selected modulus comprising a first and at least one additional multistage binary counter for registering repeated voltage impulses as numbers, an electric matrix individually associated with each of said binary counters and comprising input conductors connected with its said associated binary counter and having voltage patterns dependent on the binary numbers stored therein, output conductors, and impedance means interconnecting said input and output conductors for obtaining substantially the same predetermined voltage on a different one of said output conductors for each different voltage pattern of said input conductors, a selective switch individually associated with each binary counter for selecting any one of said output conductors of its associated matrix thereby to select a particular radix of count dependent upon the selected modulus, a control circuit means connected between each counter and that one of said switches associated with said matrix for said counter and responsive to said predetermined voltage on said selected output conductor of its associated matrix for resetting its associated binary counter to zero after each cycle of radix count of that counter, connections for electrically connecting each binary counter to the control circuit means of its preceding binary counter to register the number of reset operations of the preceding counter, means for actuating said first binary counter to register said repeated voltage impulses comprising an additional switch means and connections for connecting said control circuit means through said additional switch means to a source of repeated voltage impulses, and means comprising a reset conductor common to said binary counters and said control circuit means, a normally closed momentary opening switch electrically connected to said reset conductor, and connections for connecting said momentary opening switch to a source of negative voltage, for resetting said binary counters to zero and for resetting said control circuit means to a particular starting condition.

11. Apparatus for determining the least residue of a number to a selected modulus comprising a first and at least one additional multistage binary counter for registering repeated voltage impulses, a plurality of pairs of associated output conductors for each of said binary counters, a stage reset and an excitation conductor for each binary counter and electrically connected thereto in a predetermined relation, a control circuit means for each of said binary counters comprising an electric matrix, a multiposition electric switch, a first and second unidirectional buffer means, a voltage pulse delay means, a first voltage inverter, a binary selective gate, an excitation amplifier, and a stage reset amplifier electrically connected in a series parallel circuit between said output conductors of said binary counter and said stage reset and excitation conductors thereof, for resetting each binary counter to zero after a predetermined count controlled by a selective setting of its associated multiposition switch and dependent upon the modulus selected, means comprising an additional switch means common to said amplifiers associated with said first binary counter, and connections for connecting said stage reset conductor and said excitation conductor of said first binary counter respectively through said stage reset amplifier and said excitation amplifier and through said additional switch means to a source of repeated voltage impulses, for actuating said first binary counter to register said repeated voltage impulses, a second voltage inverter means for each additional binary counter, connections for connecting said stage reset conductor and said excitation conductor of each additional binary counter respectively through said stage reset and excitation amplifiers associated with that counter and through said second voltage inverter associated with that counter to the stage reset amplifier associated with the preceding binary counter to register the number of reset operations of the preceding binary counter, an additional reset conductor electrically connected in a predetermined relation to each stage of each of said binary counters and to each of said binary selective gates, a normally closed momentary opening switch, and connections for connecting said additional reset conductor through said momentary opening switch to a source of negative voltage to reset said counters to zero and to reset said binary selective gates to a particular operative condition in response to a momentary opening of said normally closed switch.

12. Apparatus comprising a multistage binary counter for registering repeated voltage impulses, an electric matrix for said binary counter comprising a plurality of output conductors, pairs of input conductors, each pair being connected to be responsive to the two voltage values of a different one of the stages of said binary counter, and impedance means connecting said input conductors of like voltage value from each stage of said binary counter to a different one of said output conductors for each different number registered in said binary counter and thereby producing a predetermined voltage on but one of said output conductors for each of said numbers registered, a selective switch for said binary counter for selecting any one of said output conductors of said matrix thereby to select a modulus, and a control circuit means connected to said binary counter and to said switch and responsive to said predetermined voltage on said selected output conductor of said matrix for resetting said binary counter to zero after each cycle of modulus count, said control circuit means also being connected to said output conductor of said matrix which is energized by said binary counter for producing said predetermined voltage upon registry of zero therein and being responsive to said predetermined voltage thereof for initiating another cycle of count in said binary counter.

References Cited in the file of this patent

UNITED STATES PATENTS

| Number | Name | Date |
|---|---|---|
| 2,428,811 | Rajchman | Oct. 14, 1947 |
| 2,473,444 | Rajchman | June 14, 1949 |
| 2,563,841 | Jensen | Aug. 14, 1951 |
| 2,595,045 | Desch et al. | Apr. 29, 1952 |

OTHER REFERENCES

"Electronic Computing Circuits of the Eniac," by Arthur W. Burks in the Proceedings of the I. R. E., August 1947, pages 756–767.

"Digital Computer Switching Circuit," C. H. Page, Electronics, September 1948, pages 110–116.

"Rectifier Networks for Multiposition Switching," D. R. Brown, Proceedings of the I. R. E., February 1949, pages 139–147.